No. 750,838. Patented February 2, 1904.

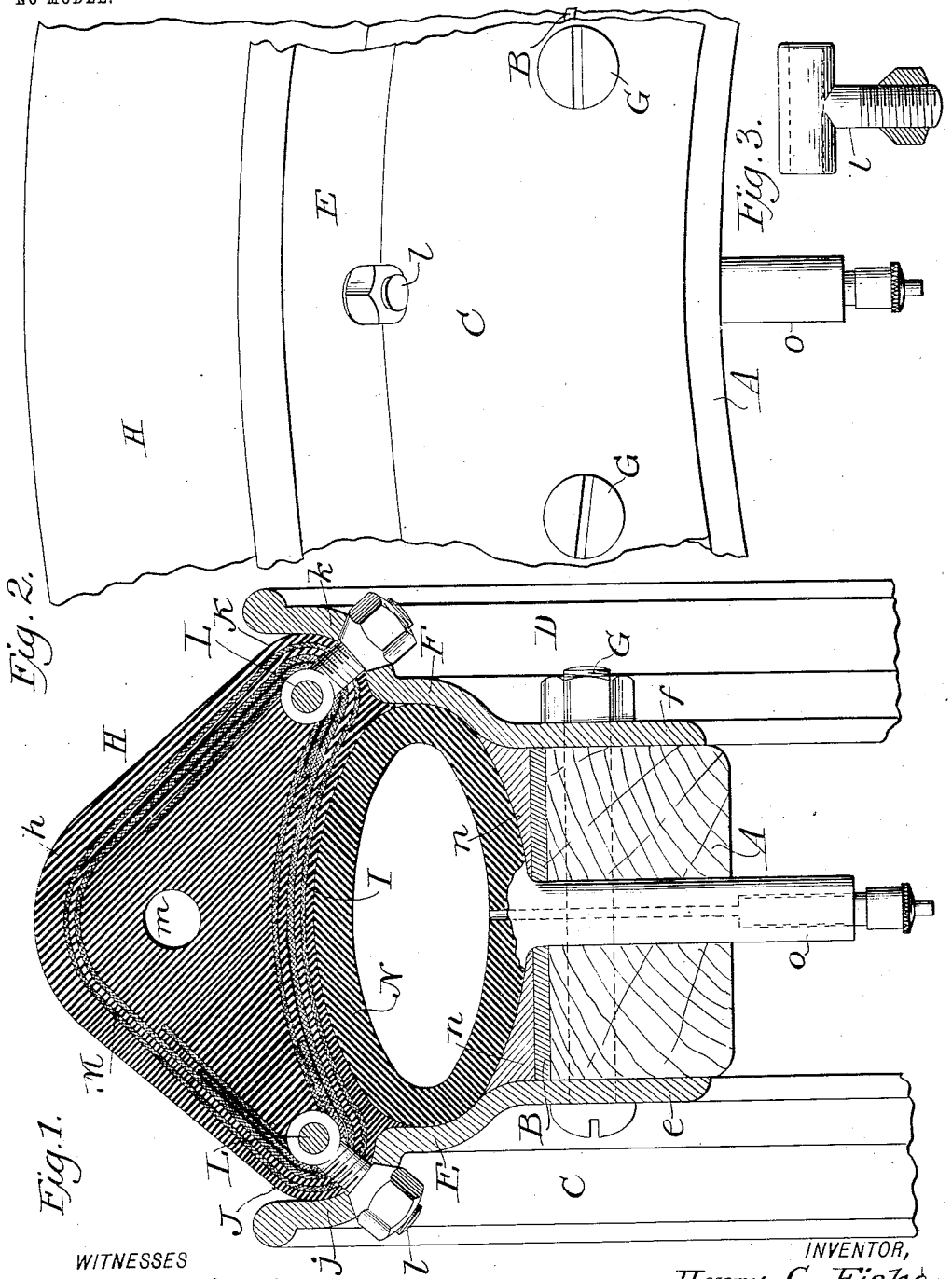

UNITED STATES PATENT OFFICE.

HENRY G. FISKE, OF NEW YORK, N. Y., ASSIGNOR, BY MESNE ASSIGNMENTS, TO MORTON TRUST COMPANY, TRUSTEE, A CORPORATION OF NEW YORK.

TIRE.

SPECIFICATION forming part of Letters Patent No. 750,838, dated February 2, 1904.

Application filed July 1, 1899. Serial No. 722,527. (No model.)

*To all whom it may concern:*

Be it known that I, HENRY G. FISKE, a citizen of the United States of America, and a resident of the city of New York, county of New York, and State of New York, have invented certain new and useful Improvements in Tires, of which the following is a specification.

My invention relates to improvements in pneumatic tires for wheels of vehicles; and while it resembles many others in certain particulars my said tire (type P) is especially designed to possess great strength and durability and particularly adapted for use with vehicles of considerable weight—such, for instance, as what are known as "automobiles," the lightest of which far exceeds in weight any form of horse-drawn vehicle to which the pneumatic tire is ordinarily applied.
As illustrated, my improved tire is applied to a wheel having a wooden felly and spokes and metallic edges projecting beyond the periphery of the felly, which together form a channel or seat for the tire which is adapted to be contained therein and to be very securely held by mechanical attachments. These may vary to some extent; but the general principle both of construction and arrangement will be particularly hereinafter pointed out in the following description and drawings and referred to in the appended claims.

In the drawings, Figure 1 is a transverse sectional elevation through the tire and felly of a wheel equipped with a tire embodying the invention. Fig. 2 is a side elevation of the tire and portion of rim appearing in section in Fig. 1. Fig. 3 is a side view of the clamping-bolt for holding the side tension-wires.

A indicates the wooden felly referred to. B is the iron band upon the periphery thereof.

C D are the side flanges, having outwardly-flaring outer edges E F, which form part of the support for the tire and the inner parallel portions $e f$, which fit against the sides of the felly A, so as to be rigidly attached thereto by bolts G, which pass through the said flanges and the felly. These flanges C D coöperate to form what is practically a retainer for the tire as a whole, and not only prevent lateral displacement of the sections in relation to each other, but also form a seat for supporting the tire.

The tire comprises an outer or tread portion H, which may be of substantially triangular or pyramidal form. The said outer portion H has a tread portion $h$ of reduced width, which may be quite narrow as compared with the entire width of the tire. The base I of the portion H is broad, and its edges J K are preferably supported in bulging extensions $j k$ of the flanges C D, where they are held in position by means of endless steel or other metal rings L L, which are wholly embedded in—that is to say, preferably molded into the portion H of the tire when the same is constructed, although they may be inserted later in a suitable opening prepared for their reception.

It will be seen that the tread portion of the tire is much wider than the felly and is supported upon the seats formed by the coöperating side flanges.

The wires L L are engaged at suitable intervals by bolts $l$, which have tubular T-heads through which said wires pass, and these bolts would have their best effect if placed in the tire when made.

The shanks on the bolts $l$ pass through the sides of the flanges, where they are engaged by tension-nuts for drawing them tightly into position. Several thicknesses of reinforcing fabric M are worked into the ground-strip H, and this reinforcement passes near the surface of the strip H, and the whole wires L L and the heads of the bolts $l$ are arranged within the said reinforcement, which may be of any desired material and of any necessary thickness.

A distinctive feature of this pyramid tire is that while possessing practically the strength and durability of a solid tire it is actually supported upon a pneumatic tube, which permits of its moving up and down to accommodate itself to the roadway with a smaller amount of motion between the reinforcing fabric and the elastic material within which it is embedded than would be the case were the said ground-strip H solidly sustained. By thus limiting the movement of the rubber and reinforcing the fabric the durability of the tire is greatly increased, the disintegration of those parts being delayed. The tube N is preferably made in oval form and located between the periphery of the felly A and the base of the tire or ground-strip H. By having this form an extended pneumatic support for the ground-strip H is provided. The tube M is partly supported upon filling-strips n n, placed on each side of the center line in order to give it a non-injurious support, and readily conforms to the normal shape of the under side of the base of the pyramidal ground-strip H, thus affording at all times a very extended pneumatic support. It may also be capable of resisting heavy pressure. The pneumatic tube N may also be reinforced by suitable protecting material, as fabric, upon its exterior in order to protect it from abrasion. By preference an opening m is formed in the middle of the fixed portion of the pyramidal ground-strip H in order to increase its resilience.

A suitable inlet-valve O is provided for the pneumatic tube N, through which the latter is filled usually with compressed air in the usual manner.

Without limiting myself to the exact details of construction herein set forth, what I claim is—

1. In combination in a wheel of a felly, an inclosing metal band, side flanges each having a flat portion standing against the side of the felly and confining the metal band, said flanges projecting outwardly and upwardly forming each a recess on its inner side for the reception of a tire edge, and a tire projecting beyond said recess, supported in a seat formed by the felly and side flanges, solid lateral portions of said tire extending laterally to a greater width than the width of the felly, endless inextensible strips embodied within said solid lateral portions, said lateral portions of the tire embodying the inextensible strips being seated in the recesses of said lateral flanges, the tire as a whole being confined within the lateral limits of said flanges whereby any contact with outside objects and abrasion is borne by the side flanges and not by the rubber of the tire.

2. In a cushion-tire for vehicle-wheels, the combination with the felly, and a metallic tire, surrounding and of the same breadth as the felly, of an elastic tire, having a pneumatic base-piece broader than the metal tire, around which it is secured, side flanges having flat bodies standing against the sides of the felly, and the edges of the metal tire, and offset outwardly therefrom, and fitting against the edges of said pneumatic base portion, and means for clamping all parts in relative position; substantially as described.

3. In a cushion-tire for vehicle-wheels, the combination with the felly, and a metallic tire surrounding and of the same breadth as the felly, of an elastic tire having a pneumatic base portion broader than the metal tire around which it is secured, side flanges having flat bodies standing against the sides of the felly and the edges of the metal tire, and offset outwardly therefrom, and fitting against the side edges of the pneumatic base-piece, filling-strips under the pneumatic base portion in the angles formed by the side flanges; substantially as described.

4. The combination with the wood felly, its metallic rim, and side flanges secured to the felly, and offset outwardly therefrom, of a tire comprising a pneumatic seat portion surrounding the rim, and an outer elastic tread portion shaped at its base to fit the said pneumatic seat, and projecting at its side edges therebeyond, and seated in the offsets of the side plates, retaining devices extending from said side edges through the said flanges, and filling-strips under the pneumatic seat portion, in the angles formed by the rim and the side flanges; substantially as described.

5. The combination with the wheel-rim, the side flanges secured thereto, and offset twice to form two annular seats and tire-sockets, and filling-strips in the angles between the rim and flanges, of a tire comprising a pneumatic seat portion elliptical in cross-section, of greater width than the rim and resting at its sides in the inner seats of the flanges, an outer elastic tread portion, encircling the said pneumatic seat projecting therebeyond at its side edges into the outer flange seats or offsets, and there provided with rings and eyebolts, the latter projecting through apertures in the said outer offsets and provided with nuts; substantially as described.

6. In a cushion-tire for vehicle-wheels, the combination with the felly and a metal tire surrounding and of the same breadth as the felly, of a tire having a pneumatic seat portion, and an elastic tread portion, the base of the tread portion being wider than the metal tire, a pair of endless rods within the corner of said base, a canvas strip enveloping the rods and attached to the material of the base, tire socket-pieces standing against the sides of the felly and the edges of the metal tire, and offsets fitting under the overhanging edges or corners of said base, and means for clamping the parts together; substantially as described.

7. The combination in a wheel of the felly, a metallic tire surrounding and inclosing the felly of the same width as the felly, side flanges standing against said felly and projecting beyond the felly, each having formed on its inner side an annular recess facing inwardly and lying beyond the felly, means for clamping said plates securely in position, an elastic tire comprising rubber and fabric seated between the portions of the lateral flanges extending beyond the felly, part of said elastic tire being of greater width than the felly and lying within said annular recesses, said portion of greater width terminating in lateral edges having fabric embodied therein, said fabric projecting along the sides of said tire to the corner forming a pocket and then inwardly, and an inextensible strip within the pocket formed by said fabric in the laterally-extending edges of said tire.

8. The combination in a wheel of an elastic tread, comprising rubber and fabric, the fabric in said tread extending the width of the base thereof, turned at the corners and extended upwardly along the sides forming a pocket in the lateral base-corners, an inextensible wire embodied in each of the two pockets in the corners, lateral flanges inclosing the base-corners of said tread and embodying inwardly-concave recesses supporting and inclosing said tread portion, said flanges extending beyond the tire whereby the tread is protected against lateral contact with outside objects and consequent abrasion, means for supporting the seat of said tread and the lateral flanges including a felly, and transverse bolts securing the whole rigidly in position.

9. The combination in a wheel of a solid elastic tire having the lateral edges of greater width than its base, fabric permanently embodied in said base extending on the base side of each lateral corner and turned upwardly forming a pocket therein, endless inextensible wires in said base corner-pockets, flexible fabric extending from side to side of the base of the tire interconnecting the corner-pockets, side flanges having recesses to relieve the extreme corners of said tire, and inextensible wires whereby said tire-corners are supported and protected, the extremities of the flanges extending beyond the widest portion of the elastic tire laterally so as to protect it against abrasion and contact with outside objects, means for supporting said tire and flanges and holding the same together in fixed relation as and for the purpose described.

Signed by me at New York, N. Y., this 30th day of June, 1899.

HENRY G. FISKE.

Witnesses:
FRANKLAND JANNUS,
J. S. DE SELDING.